W. E. NEWTON.
LAMP BRACKET FOR MOTOR CYCLES.
APPLICATION FILED AUG. 1, 1912.
1,056,574.  Patented Mar. 18, 1913.
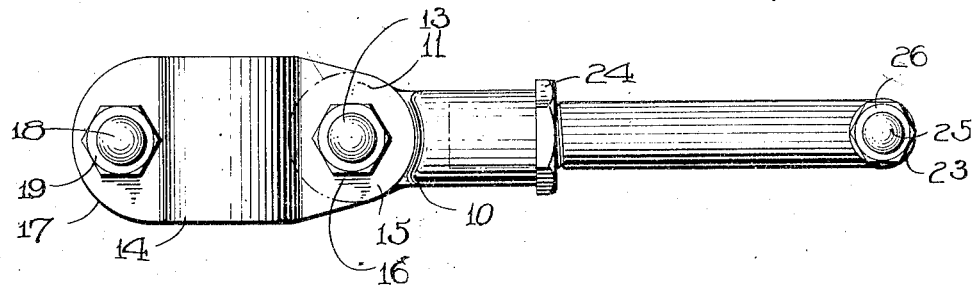
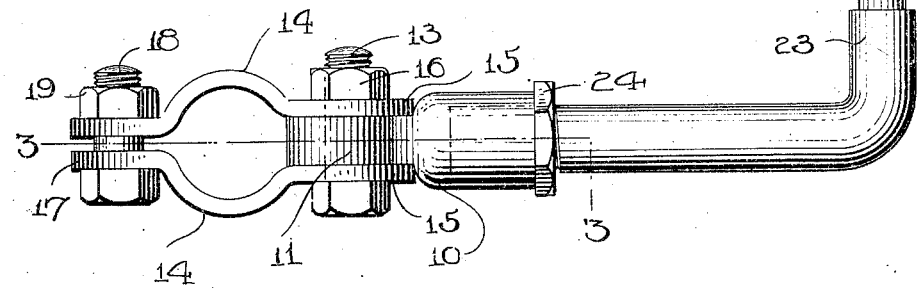
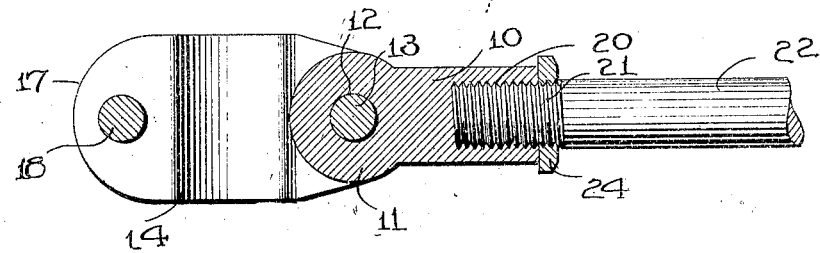
WITNESSES
INVENTOR
Willis E. Newton.
By T. E. Vrooman, Attorney.

UNITED STATES PATENT OFFICE.

WILLIS E. NEWTON, OF TACOMA, WASHINGTON.

LAMP-BRACKET FOR MOTOR-CYCLES.

1,056,574.  Specification of Letters Patent.  Patented Mar. 18, 1913.

Application filed August 1, 1912. Serial No. 712,685.

*To all whom it may concern:*

Be it known that I, WILLIS E. NEWTON, a citizen of the United States, residing at Tacoma, in the county of Pierce and State of Washington, have invented certain new and useful Improvements in Lamp-Brackets for Motor-Cycles, of which the following is a specification, reference being had therein to the accompanying drawing.

This invention relates to brackets and has special reference to a bracket for attaching a lamp to a motor cycle and other vehicles of like character.

The principal object of the invention is to provide a simple and efficient device which may be secured to any motor cycle or other like vehicle which will securely support a lamp attached thereto.

With the above and other objects in view the invention consists in general of certain novel constructions, combinations and arrangements of parts, as will be hereinafter fully described, illustrated in the accompanying drawings and specifically claimed.

In the accompanying drawings like characters of reference indicate like parts in the several views, and Figure 1 is a top plan of the device. Fig. 2 is an elevation thereof. Fig. 3 is a detail section on the line 3—3, Fig. 2.

In the present embodiment of the invention there is provided a cylindrical body 10 having one end flattened as at 11 and this flattened end is provided with an opening 12 wherethrough passes a bolt 13 which is used to secure a pair of clips 14 adapted to engage a portion of the frame forks or handle bars of a motorcycle. These clips are each provided with a perforated ear 15 through which the bolt 13 passes and the bolt is in turn provided with a nut 16 to clamp the clips in adjusted position relative to the body 10. In order to make these clips hold tightly to the motorcycle frame forks or handle bars they are also provided with ears 17 having suitable openings therein for the reception of a bolt 18 which is provided with a nut 19. These ears are normally spaced as indicated in Fig. 2 but may be brought closer together by screwing up the bolt 18 and nut 19 so that they can securely clamp an object held between the clips 14.

The body 10 is provided with a threaded recess 20 wherein is engaged the threaded end 21 of a rod 22 which is bent, preferably at right angles as indicated at 23. This rod is held in adjusted position in the opening 20 by means of a lock nut 24 and the rod is furthermore provided with a reduced end 25 adapted to be engaged by the lamp clip, the end having a threaded extremity carrying a nut 26 to prevent the lamp slipping therethrough.

In using the device the clips 14 are secured to some part of the frame forks or handle bars of the machine and the rod 22 is adjusted in position by turning the same between the ears 15 and locking it in adjusted position by means of the bolt 13 and nut 16. The end 23 may also be adjusted by loosening the nut 24 and revolving the rod 22 so that the end 23 may project either horizontally, vertically, or at any angle between horizontal and vertical positions.

There has thus been provided a simple and efficient device of the kind described and for the purpose specified.

Having thus described the invention, what is claimed as new, is:—

In a device of the kind described, a body having a threaded recess in one end and having its other end flattened and provided with a bolt receiving opening, a rod having a threaded end screwed into said recess, a lock nut on said rod, an angularly disposed outer extremity on said rod, a pair of clips provided with ears having openings therein registering with the opening in the reduced end of the body, a bolt passing through said openings, a nut on said bolt, other ears extending from said clips, a bolt passing through the last-mentioned ears, and a nut on the last-mentioned bolt.

In testimony whereof I hereunto affix my signature in presence of two witnesses.

WILLIS E. NEWTON.

Witnesses:
 FRANK P. FENTRESS,
 S. F. MCANALLY.